United States Patent
Ho et al.

(10) Patent No.: US 8,496,338 B2
(45) Date of Patent: Jul. 30, 2013

(54) LENS MODULE WITH SPACER

(75) Inventors: Hung-Lung Ho, New Taipei (TW);
Sheng-Jung Yu, New Taipei (TW);
Tsung-Yu Lin, New Taipei (TW)

(73) Assignee: Wcube Co., Ltd., George Town (KY)

( * ) Notice: Subject to any disclaimer, the term of this patent is extended or adjusted under 35 U.S.C. 154(b) by 95 days.

(21) Appl. No.: 13/313,028

(22) Filed: Dec. 7, 2011

(65) Prior Publication Data
US 2013/0021681 A1    Jan. 24, 2013

(30) Foreign Application Priority Data
Jul. 22, 2011 (TW) .................................. 100125902

(51) Int. Cl.
*G02B 5/00* (2006.01)
(52) U.S. Cl.
CPC ..................................... *G02B 5/005* (2013.01)
USPC ............................ 359/503; 359/611; 359/740
(58) Field of Classification Search
CPC ............................. G02B 5/005; G02B 2005/00
USPC .................................. 359/503, 611, 738–740
See application file for complete search history.

(56) References Cited

U.S. PATENT DOCUMENTS

| 7,158,318 | B2 * | 1/2007 | Shirie ........................... 359/738 |
| 7,760,450 | B2 * | 7/2010 | Lin et al. ....................... 359/819 |
| 2007/0030578 | A1 * | 2/2007 | Vinogradov et al. ......... 359/738 |
| 2011/0102901 | A1 * | 5/2011 | Lin ................................ 359/601 |
| 2012/0314288 | A1 * | 12/2012 | Lai ................................ 359/503 |

* cited by examiner

*Primary Examiner* — Darryl J Collins
(74) *Attorney, Agent, or Firm* — Altis Law Group, Inc.

(57) ABSTRACT

A lens module includes a lens barrel, a first lens, a second lens, and a spacer. The lens barrel includes an object-side end and an image-side end opposite to the object-side end. The first lens is received in the lens barrel, and adjacent to the object-side end. The second lens is received in the lens barrel, and adjacent to the image-side end in relative to the first lens. The spacer is an annular plate, and includes an object-side surface, an image-side surface opposite to the object-side surface, and an inner sidewall. The spacer is positioned between the first lens and the second lens. The object-side surface faces the first lens, and the image-side surface faces the second lens. The intersection of the object-side surface and the inner sidewall forms a chamfer.

6 Claims, 3 Drawing Sheets

LENS MODULE WITH SPACER

BACKGROUND

1. Technical Field

The present disclosure relates to lens modules and, particularly, to a lens module with a spacer.

2. Description of Related Art

Lens modules generally include a first lens, a second lens, and a spacer. The spacer is disposed between the first lens and the second lens and used for blocking light rays. However, some spacers are annular and include an inner cylindrical surface, which may redirect light rays to the second lens and adversely affect the image quality.

Therefore, it is desirable to provide a new lens module, which can overcome the limitations described.

DETAILED DESCRIPTION

Embodiments of the disclosure will be described in detail, with reference to the accompanying drawings.

Figure 1:
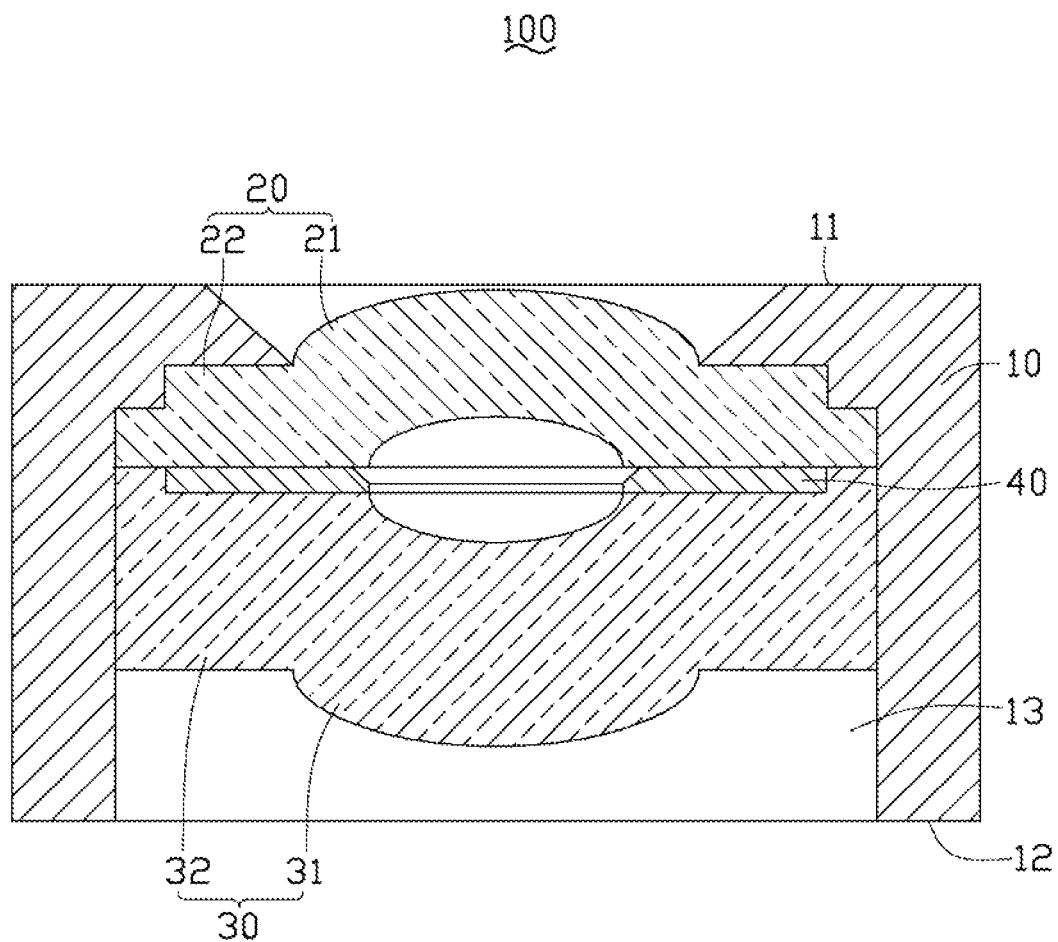
FIG. 1 is a cross-sectional schematic view of a lens module of an exemplary embodiment.

Referring to FIG. 1, a lens module 100, according to an exemplary embodiment, includes a lens barrel 10, a first lens 20, a second lens 30, and a spacer 40.

The lens barrel 10 is tubular and includes an object-side end 11 and an image-side end 12 opposite to the object-side end 11. The lens barrel 10 defines a through hole 13 extending from the object-side end 11 to the image-side end 12. In this embodiment, the lens barrel 10 is made of light-shielding/opaque/black materials.

The first lens 20 is received in the through hole 13, adjacent to the object-side end 11. The first lens 20 includes a first optical portion 21 and a first non-optical portion 22 surrounding the first optical portion 21.

The second lens 30 is received in the through hole 13 between the first lens 20 and the image-side end 12. The second lens 30 includes a second optical portion 31 and a second non-optical portion 32 surrounding the second optical portion 31.

In this embodiment, the first lens 20 and the second lens 30 are made of glass or plastic, and may be spherical or aspheric lenses. The first optical portion 21 and the second optical portion 31 are for collecting images and it is required that all light rays entering into the barrel 10 are collected to pass therethrough. The first non-optical portion 22 and the second non-optical portion 32 are not required for image-collecting and therefore it is necessary that no, or as few as possible, light rays pass therethrough. In other configurations of the lens module 100, other lenses can be included and arranged at appropriate positions at two sides of the first lens 10 and the second lens 20.

Figure 2:
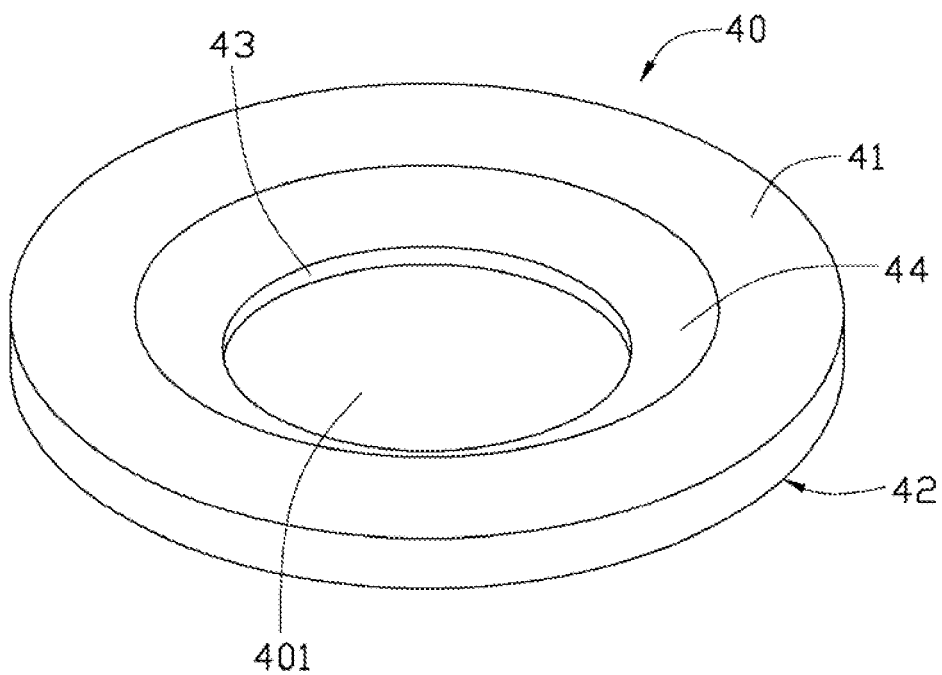
FIG. 2 is an isometric schematic view of a spacer of the lens module of FIG. 1.
Figure 3:
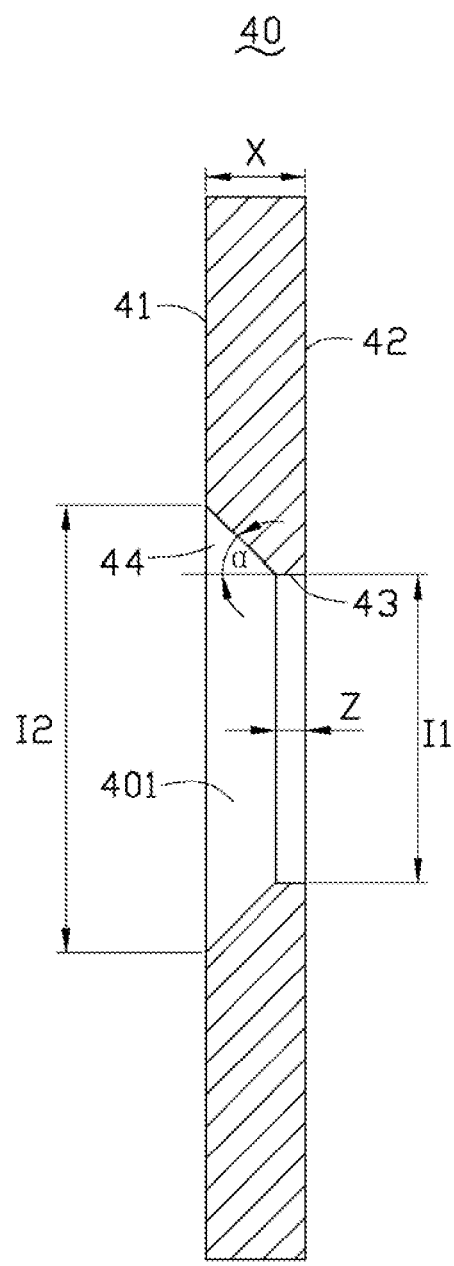
FIG. 3 is a cross-sectional schematic view of the spacer of FIG. 2.

Referring to FIGS. 2-3, the spacer 40 is an annular plate and made of light-shielding/opaque/dark materials. The spacer 40 is received in the through hole 13, and is positioned between the first lens 20 and the second lens 30. The spacer 40 includes an object-side surface 41 and an image-side surface 42. The object-side surface 41 faces the object-side end 11 of the lens module 10, and the image-side surface 42 faces the image-side end 12. The spacer 40 defines a through hole 401 from the object-side surface 41 to the image-side surface 42, generally at the center of the spacer 40. The through hole 401 includes an inner sidewall 43, and the inner sidewall 43 is generally parallel with an optical axis of the lens module 100.

A chamfer 44 is formed at the intersection of the object-side surface 41 and the inner surface 43. In this embodiment, the chamfer 44 is bevel shaped. An included angle α is formed between the chamfer 44 and the optical axis of the lens module 100. The included angle α is open toward the object-side end 11, and the included angle α satisfies the formulas:

$$\alpha = \arctan\frac{I2 - I1}{2(X - Z)};$$

and $$0 < Z \leq 0.01$$

wherein I1 is a diameter of the through hole 401 on the image-side surface 42, I2 is a diameter of the through hole 401 on the object-side surface 41, X is a thickness of the spacer 40 measured in a direction that is substantially parallel to the optical axis of the lens module 100, and Z is a width of the inner sidewall 43 measured in a direction that is substantially parallel to the optical axis of the lens module 100.

In this embodiment, a is in a range from about 30 degrees to about 60 degrees, Z is about 0.005 mm. The spacer 40 is sandwiched between the first non-optical portion 22 and the second non-optical portion 32. If Z is greater than 0.01 mm, there will be a small amount of light rays reflected by the inner sidewall 43 and projected to the second lens 30, and adversely affect the image quality.

In operation, light rays enter into the lens module 100 from the object-side surface 11 of the lens barrel 10 and meet the first lens 20. A first portion of the light rays penetrates through the first optical portion 21 of the first lens 20, the through hole 401 of the spacer 40, and the second optical portion 31 of the second lens 30, and is then projected onto an image sensor (not shown). A second portion of the light rays penetrates through the first non-optical portion 22 of the first lens 20, and is blocked by the spacer 40. A third portion of the light rays penetrates through the first optical portion 21 of the first lens 20, and meets the chamfer 44. As the chamfer 44 is facing the object-side surface 11, any light rays striking the chamfer 44 will not be reflected off the chamfer 44 onto the second lens 30.

Particular embodiments are here shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A lens module, comprising:
   a lens barrel comprising an object-side end and an image-side end opposite to the object-side end;
   a first lens received in the lens barrel, and adjacent to the object-side end;
   a second lens received in the lens barrel, and adjacent to the image-side end in relative to the first lens; and
   a spacer positioned between the first lens and the second lens, and comprising an object-side surface and an image-side surface, the object-side surface facing the first lens, the image-side surface facing the second lens;

the spacer defining a through hole penetrating through the image-side surface and the object-side surface, the through hole comprising an inner sidewall; a chamfer positioned at the intersection of the object-side surface and the inner sidewall, an included angle α formed between the chamfer and an optical axis of the lens module, the included angle α satisfying the formulas:

$$\alpha = \arctan\frac{I2 - I1}{2(X - Z)};$$

and $$0 < Z \leq 0.01$$

wherein I1 is a diameter of the through hole on the image-side surface, I2 is a diameter of the through hole on the object-side surface, X is a thickness of the spacer measured in a direction that is substantially parallel to the optical axis of the lens module, and Z is a width of the inner sidewall measured in a direction that is substantially parallel to the optical axis of the lens module.

2. The lens module of claim 1, wherein the chamfer is bevel shaped.

3. The lens module of claim 2, wherein the included angle α is in a range from about 30 degrees to about 60 degrees.

4. The lens module of claim 1, wherein the first lens comprises a first optical portion and a first non-optical portion surrounding the first optical portion, the second lens comprises a second optical portion and a second non-optical portion surrounding the second optical portion.

5. The lens module of claim 4, wherein the spacer is sandwiched between the first non-optical portion and the second non-optical portion.

6. The lens module of claim 1, wherein the inner sidewall is parallel with the optical axis of the lens module.

* * * * *